United States Patent [19]

Ido

[11] Patent Number: 4,947,817
[45] Date of Patent: Aug. 14, 1990

[54] SYSTEM AND METHOD FOR CONTROLLING FUEL COMBUSTION FOR AN INTERNAL COMBUSTION ENGINE

[75] Inventor: Kou Ido, Kanagawa, Japan

[73] Assignee: Nissan Motor Company, Limited, Yokohama, Japan

[21] Appl. No.: 296,815

[22] Filed: Jan. 13, 1989

[30] Foreign Application Priority Data

Jan. 13, 1988 [JP] Japan .................................. 63-3692

[51] Int. Cl.$^5$ .............................................. F02P 5/04
[52] U.S. Cl. .................................... 123/425; 123/486; 123/179 R
[58] Field of Search .................... 123/425, 486, 179 R, 123/179 B, 435, 417; 74/861, 868

[56] References Cited

U.S. PATENT DOCUMENTS

| 4,677,878 | 7/1987 | Yamamori et al. | 123/425 |
| 4,715,342 | 12/1987 | Nagai | 123/425 |
| 4,729,358 | 3/1988 | Morita et al. | 123/425 |
| 4,821,697 | 4/1989 | McDougal | 123/425 |

FOREIGN PATENT DOCUMENTS 60-212673 10/1985 Japan .................................. 123/425
2156905 10/1985 United Kingdom ................ 123/425

Primary Examiner—Raymond A. Nelli
Attorney, Agent, or Firm—Foley & Lardner, Schwartz, Jeffery, Schwaab, Mack, Blumenthal & Evans

[57] ABSTRACT

A system and method for controlling fuel combustion for an internal combustion engine in which one of a plurality of maps representing basic control values derived according to the engine operating condition which corresponds to fuel having a high octane number is first and always selected and used for combustion control at an initial state of the engine whenever the engine is started. When the engine is transferred into a predetermined area of the engine operating condition during the use of the map, the ignition timing angle is retarded by a retardation amount upon detection of occurrence of engine knocking and the map is switched to another map which corresponds to fuel having a low octane number. A control value (e.g., ignition timing angle value) is set which controls the combustion state and a parameter associated with the engine combustion state is operated to control the combustion state on the basis of the control value. Therefore, the situation of being unable to use the map for high-octane gasoline can be avoided

11 Claims, 4 Drawing Sheets

FIG. 3(A)

HIGH-OCTANE GASOLINE MAP

| SI \ N | 1 | 2 | - - | - - - - |
|---|---|---|---|---|
| 1 | $A_{11}$ | $A_{21}$ | - - | - - - - |
| 2 | $A_{12}$ | $A_{22}$ | - - | - - - - |
| ⋮ | - - | - - | - - | - - - - |
| ⋮ | - - | - - | - - | - - - - |

FIG. 3(B)

LOW-OCTANE GASLINE MAP

| SI \ N | 1 | 2 | - - | - - - - |
|---|---|---|---|---|
| 1 | $B_{11}$ | $B_{21}$ | - - | - - - - |
| 2 | $B_{12}$ | $B_{22}$ | - - | - - - - |
| ⋮ | - - | - - | - - | - - - - |
| ⋮ | - - | - - | - - | - - - - |

FIG. 4(A)

| N | 1 | 2 | - - | - - |
|---|---|---|---|---|
| $KLM_1$ | $\beta_{11}$ | $\beta_{12}$ | - - | - - |

FIG. 4(B)

| N | 1 | 2 | - - | - - |
|---|---|---|---|---|
| $KLM_2$ | $\beta_{21}$ | $\beta_{22}$ | - - | - - |

SYSTEM AND METHOD FOR CONTROLLING FUEL COMBUSTION FOR AN INTERNAL COMBUSTION ENGINE

BACKGROUND OF THE INVENTION (1) Field of the invention

The present invention relates to a system and method for controlling fuel combustion according to an octane number of fuel used for an internal combustion engine mounted in a vehicle body.

(2) Background of the art

When a spark ignited engine is driven using a certain kind of fuel, with its compression ratio increased and/or the ignition timing advanced, engine knocking would occur. The engine knocking would cause overheating and/or reduction in performance of the engine, and, in a worst case, would cause damage to the engine structure.

An octane number of the fuel used for the engine represents an anti-knock characteristic of the fuel to prevent such a reduction in engine performance as described above.

The octane numbers of gasoline fuels commercially available on the Japanese market usually are indicated as follows:

Regular (Low-octane) gasoline—about 91 (octane); and

Super (High-octane) gasoline—about 98 (octane).

It is necessary to increase combustion speed as high as possible and so as not to generate engine knock in terms of the thermal efficiency of the engine. The high-octane gasoline is advantageous due to its high octane number when used as the fuel for an engine in which advancement of ignition timing is carried out to control the fuel combustion to avoid engine knocking.

If the regular (low-octane) gasoline is erroneously or inevitably used due to the lack of availability of the high-octane gasoline for the fuel in an engine designed to use the high-octane gasoline as the fuel, a sufficient engine output corresponding to that for the case of using the high-octane gasoline could not be obtained or engine knocking would frequently occur. Consequently, engine driveability worsens.

A Japanese Patent Application First Publication (Non-examined) No. Sho60-212673 published on Oct. 24, 1985 exemplifies an engine ignition timing controlling system in which two combustion controlling maps for the regular gasoline and for the high-octane gasoline are prepared and the two maps are automatically switched together to use for the fuel combustion control in each combustion chamber of the engine according to the octane number of the fuel used in order to solve the above-described problem.

In the ignition timing controlling system disclosed in the above-identified Japanese Patent Application First Publication, the ignition timing control is carried out using one of the maps for the regular gasoline prepared for such a low-octane gasoline after the engine is started. Thereafter, the ignition timing is advanced at a constant rate of advance angles when the engine operating condition falls in a predetermined determination area. When the ignition timing angle is advanced and exceeds a tresold value without the occurrence of knocking, the system determines that the fuel has the high octane number and executes another ignition control using the other map prepared for the high-octane gasoline fuel. In addition, when the knocking occurs during use of the other map for the high-octane gasoline, the ignition timing is retarded. At this time when a retardation amount (retard angle of the ignition timing) exceeds a maximum retardation amount, the map used for the ignition timing control is switched to the map prepared for the low-octane gasoline.

However, since in the above-described ignition timing controlling system disclosed in the above-identified Japanese Publication a difference between each basic control value for the high-octane gasoline and for the low-octane gasoline is large if the system erroneously determines that the fuel used in the engine designed to meet the high-octane gasoline fuel is the low-octane gasoline due to weather conditions or other reasons although the actual fuel is the high-octane gasoline, the ignition timing is excessively retarded (exceeding the maximum retardation amount) with respect to a natural fuel characteristic. Therefore, the map use is not permanently returned to the map prepared for the high-octane gasoline when the engine has been started.

Consequently, the engine output corresponding to that in the case of using the high-octane gasoline cannot be obtained. In addition, the engine performance is further deteriorated as compared with the case using the low-octane gasoline and, in the worst case, the engine would be damaged due to the increase in exhaust gas temperature.

SUMMARY OF THE INVENTION

It is, therefore, an object of the invention to provide a system and method for controlling fuel combustion for an internal combustion engine in which fuel combustion control is returned to that for a high-octane gasoline whenever the engine is started even if the system erroneously determines that a low-octane gasoline is used as the fuel during the use of a high-octane gasoline in order to prevent an erroneous long term operation of the fuel combustion control for the low-octane gasoline.

The above-described object can be achieved by providing a system for controlling fuel combustion for an internal combustion engine, comprising: (a) first means for detecting an engine operating condition; (b) second means for setting and storing basic control values into a plurality of maps, each basic control value defined for controlling the fuel combustion state according to the engine operating condition and each map being prepared therein for each fuel having a different octane number; (c) third means for setting a control value defined for controlling the combustion state on the basis of the basic control value retrieved from one of the maps according to the engine operating condition; (d) fourth means for selecting and using one of the maps which corresponds to the fuel having an octane number exceeding a predetermined value whenever the engine is started irrespective of actual use of the engine fuel; and (e) fifth means for deriving a control value defined for controlling the fuel combustion state on the basis of the selected basic control value and operating a parameter associated with the combustion state on the basis of the control value.

The above-described object can also be achieved by providing a system for controlling fuel combustion for an internal combustion engine, comprising: (a) first means for detecting an engine operating condition; (b) second means for detecting an occurrence of engine knocking; (c) third means for setting and storing into one of a plurality of maps basic control values defined for controlling combustion states according to the engine operating condition, each map being prepared for one kind of fuel having a different octane number; (d) fourth means for selecting a first one of the maps which corresponds to the basic control values for the fuel having the octane number exceeding a predetermined value when the engine is started irrespective of actual use of the fuel; (e) fifth means for determining whether the engine falls in a predetermined area of the engine operating condition during use of the first map, retarding an ignition timing value by a retardation amount upon detection of the occurrence of knocking when the engine falls in the predetermined area and for switching from the first map to a second one of the maps prepared for the fuel having the octane number below the predetermined value when the retardation mount exceeds a switching reference value; (f) sixth means for setting control values defined for controlling combustion states and retrieved from one of the maps according to the engine operating condition which is selected by the fourth means or switched by the fifth means; and (g) seventh means for operating a parameter concerning each combustion state of the engine on the basis of the outputted control values derived from the sixth means.

The above-described object can also be achieved by providing a method for controlling fuel combustion for an internal combustion engine, comprising the steps of: (a) detecting an engine operating condition; (b) setting and storing basic control values into a plurality of maps, each basic control value defined for controlling the fuel combustion state according to the engine operating condition and each map being prepared therein for each fuel having a different octane number; (c) setting a control value defined for controlling the combustion state on the basis of the basic control value retrieved from one of the maps according to the engine operating condition; (d) selecting and using one of the maps which corresponds to the fuel having an octane number exceeding a predetermined value whenever the engine is started irrespective of actual use of the engine fuel; and (e) deriving a control value defined for controlling the fuel combustion state on the basis of the selected basic control value and operating a parameter associated with the combustion state on the basis of the control value.

BRIEF DESCRIPTION OF THE DRAWINGS

FIGS. 3 (A) to 4 (B) are examples of maps used in the fuel combustion controlling system in the preferred embodiment shown in FIGS. 1 to 2 (B).

DETAILED DESCRIPTION OF THE PREFERRED EMBODIMENT

Reference will hereinafter be made to the drawings in order to facilitate understanding of the present invention.

Figure 1:
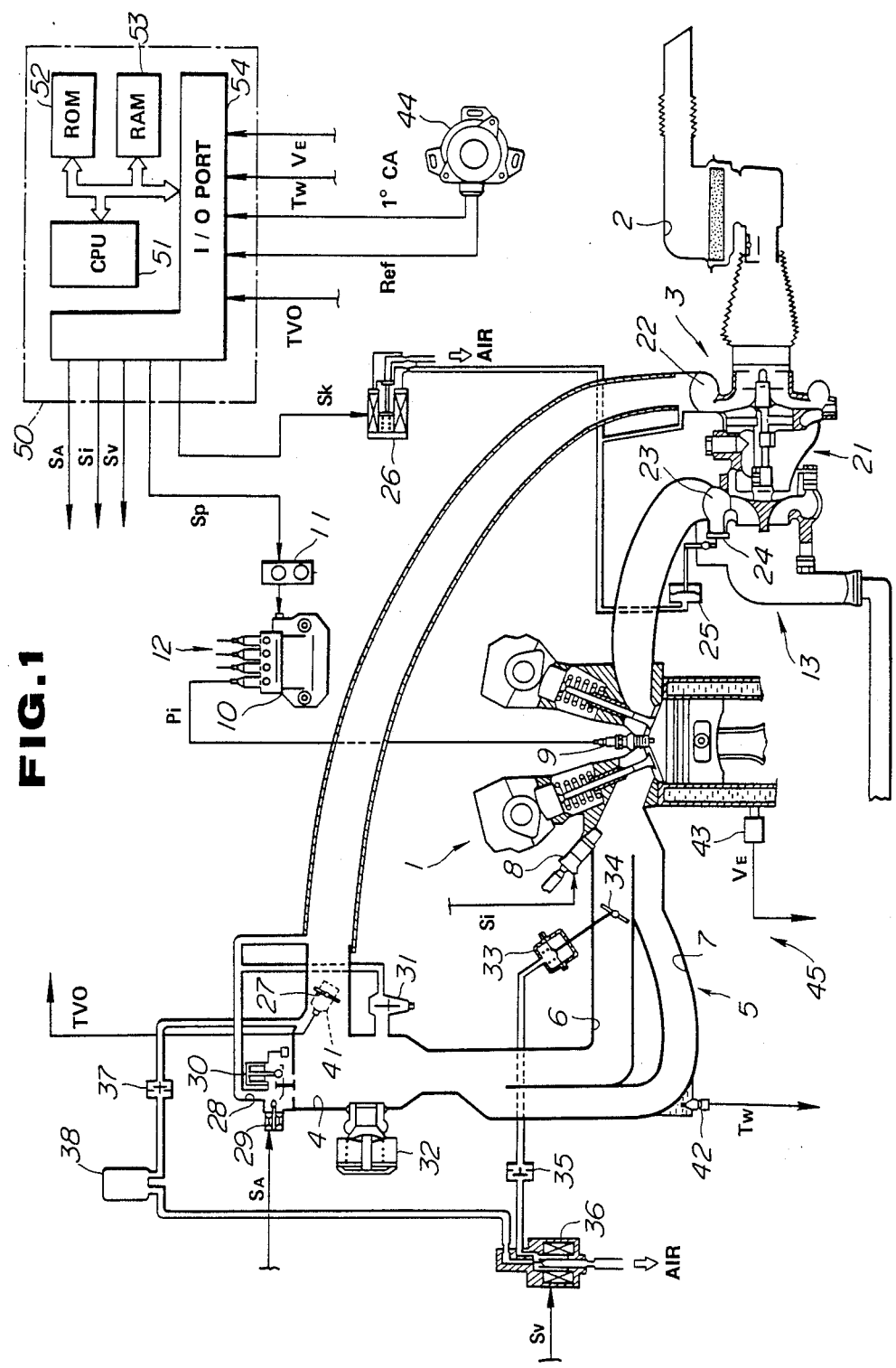
FIG. 1 is a schematic overall view of a system for controlling fuel combustion for an internal combustion engine in a preferred embodiment according to the present invention.
Figure 2A:
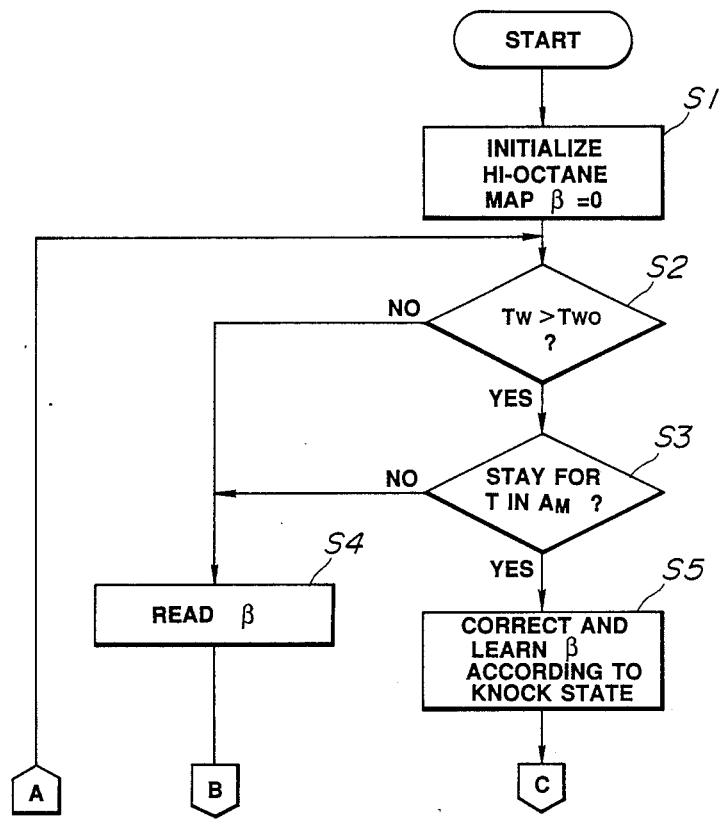
FIGS. 2 (A) and 2 (B) are integrally a flowchart of a control routine executed in the system shown in FIG. 1.
Figure 2B:
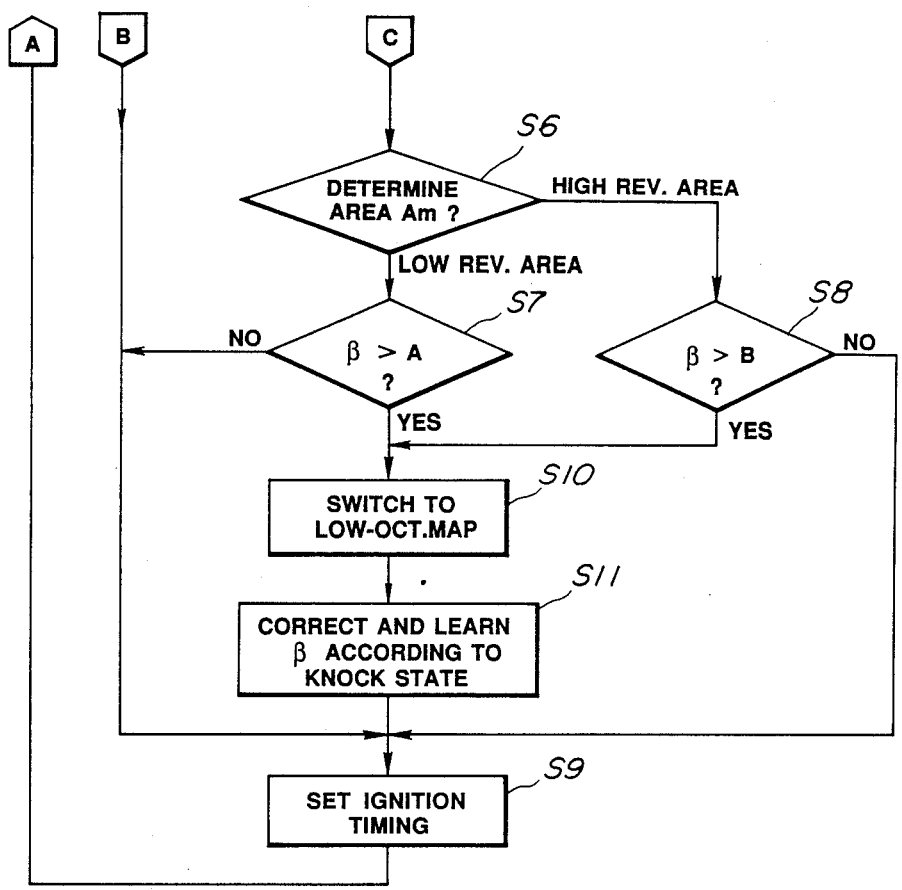

FIGS. 1 to 2 (B) show a preferred embodiment of a fuel combustion controlling system and method according to the present invention.

In FIG. 1, an engine body 1 is provided with an air cleaner 2 through which an intake air is sucked into each cylinder via an intake air passage 3 and throttle chamber 4. The engine body 1 is further provided with a main port 6 and sub port 7 in an intake manifold 5 corresponding to each cylinder through which the intake air is passed into each cylinder. A fuel injection valve 8 is installed within a junction of the main and sub ports 6 and 7 and injects fuel in response to a fuel injection signal having a pulsewidth $S_i$.

An ignition plug 9 is equipped within each cylinder. A high surge pulse $P_i$ is supplied to each ignition plug 9 from an ignition coil 10 and power transistor 11. The high surge pulse $P_i$ is generated and supplied to each ignition plug 9 on the basis of an ignition signal $S_p$ outputted at a predetermined ignition timing. One of parameters associated with a combustion state of the engine is represented by the ignition timing.

The other parameters include a fuel injection quantity and turbo charged pressure.

The air-fuel mixture in the engine cylinders is ignited and burned in response to the high surge pulse $P_i$ and exhausted through an exhaust gas passage 13.

Furthermore, a compressor 22 of a turbo charger 21 is disposed in the intake air passage 3, the compressor 22 being communicated with a turbine 23 disposed in the exhaust gas passage 13. The turbo charger 21 drives the turbine 23 through the exhaust gas and turbo charges the intake air through the compressor 22 interlocking with the turbine 23.

The turbo-charged pressure of the turbo charger 21 is varied by means of a swing valve 24 and a swing valve controller 25. The controlled pressure to the swing valve controller 25 is adjusted by means of a turbo charge pressure controlling solenoid valve 26 in response to a turbo-charged pressure control signal $S_k$.

A throttle valve 27 is installed within a throttle chamber 4 at a downstream side of the turbo charger 21. The intake air quantity during a time other than engine idling time is controlled by means of the throttle valve and that during the idling time is controlled by means of an AAC valve 29 and FICD valve 30, both valves disposed in a bypass passage 28 communicating an upstream and downstream sides of the throttle valve 27.

The opening angle of the AAC valve 29 is varied according to an idle engine revolution speed controlling signal $S_A$ to control the intake air quantity so that the engine idling revolution speed is maintained at a target value. The FICD valve 30 is opened together with operation of a predetermined accessory (,e.g., air conditioner) so that the intake air quantity is increased by a preset quantity to increase the idling engine revolution speed. An air regulator 31 provides means for communicating the upstream and downstream sides of the throttle valve 27 and for introducing the air at the upstream side of the throttle valve 27 into the downstream side of the throttle valve 27 to maintain fuel pressure supplied to the fuel injection valve 8. An intake relief valve 32 is a safety valve which opens when the intake air pressure (turbo charged pressure) in the throttle chamber 4 is excessively high so that the intake air within the throttle chamber 4 is discharged into the air to reduce the turbo charged pressure to a safe level.

The intake air in the throttle chamber 4 is branched at the intake manifold 5 to the main port 6 and sub port 7. The main port 6 is a port having a relatively large diameter within which a power valve 34 which is opened and closed by means of a variable intake air controlling actuator 33.

A controlled negative pressure is supplied from the variable intake air controlling solenoid valve 36 via a delay valve 35. The variable intake air controlling solenoid valve 36 leaks the intake air negative pressure at the downstream side of the throttle chamber 4 introduced via a check valve 37 and vacuum tank 38 to the air on the basis of a power valve switching signal $S_v$ so that the controlled negative pressure supplied to the variable intake air controlling actuator 33 is changed. The variable intake air controlling actuator 33 responds to the controlled negative pressure to open and close the power valve 34.

On the other hand, the sub port 7 is a port having a relatively small diameter and a length longer than the main port 6. It is noted that when the engine speed is low, the power valve 34 is closed so that the intake air flows through the sub port 7 and its flow speed is increased due to its dimension, thereby the charge efficiency is increased due to an inertia turbo charge effect to increase engine output torque. When the engine speed is high, the power valve 34 is opened so that the intake air flows through both main and sub ports 6 and 7, thereby decreasing intake air resistance being to achieve a high output turbo charge pressure.

In addition, a throttle sensor 41 detects an opening angle TVO of the throttle chamber 4 and an engine coolant temperature sensor 42 detects an engine coolant temperature $T_W$. A knock sensor 43 detects engine knocking vibrations $V_E$ generated on the engine body 1. A crank angle of the engine is detected by means of as crank angle sensor 44 which generates and outputs a unit angle signal 1° CA corresponding to one degree (1°) of the crank angle. It is noted that the crank angle 44 also sensor (outputs a cylinder identification signal Ref for identifying each cylinder.

The output signals from the above-described sensors are supplied to a control unit 50.

The control unit 50 includes a CPU (Central Processing Unit) 51, ROM (Read Only Memory) 52, RAM (Random Access Memory), and I/0 Port 54.

Each signal $S_i$, $S_p$, $S_K$, $S_A$, and $S_V$ is outputted from the I/0 Port 54.

The ROM 52 includes arithmetric operation programs for the execution by the CPU 51, a regular (low-octane) map in which a basic control value of the ignition timing is set according to the engine operating condition so as to correspond to the low-octane number fuel, and a high-octane map in which the basic control value of the ignition timing is set according to the engine operating condition so as to correspond to the high-octane gasoline fuel. The RAM 53 is a working memory temporarily storing data used for the arithmetic operation and results of arithmetic operations.

The control operation of the fuel combustion controlling system will be described with reference to FIGS. 2 (A) and 2 (B).

It is noted that the CPU 51 of the control unit 50 executes the fuel injection quantity control to provide the fuel injection signal having the pulsewidth of $S_i$ on the basis of the engine revolution signal N derived from the crank angle signal 1° CA, intake air quantity derived from the throttle opening angle signal TVO, and engine coolant temperature $T_w$ whenever the engine has rotated through two revolutions (720°).

The contents of the fuel injection quantity control is exemplified by the Japanese Patent Application First Publication No. Sho 60-212673, the disclosure of which is hereby incorporated by reference.

It is also noted that the flowchart shown in FIGS. 2 (A) and 2 (B) is started whenever an ignition key switch is turned to ON and executed for each predetermined period of time.

In step $S_1$, the CPU 51 first executes an initialization using the high octane map for an initial stage of the engine drive having slice levels (TSL: basic control values) for the high-octane number gasoline fuel and sets an initial value of an ignition timing correction quantity $\beta$ to zero.

In steps $S_2$ and $S_3$, the CPU 51 determines whether the engine falls in an operating condition such that a map switching should be determined. That is to say, the CPU 51 determines if the coolant temperature $T_W$ detected by the water temperature sensor 42 exceeds a predetermined temperature $T_{WO}$.

In step S3, the CPU 51 determines whether the engine operating condition enters a predetermined area of engine operating condition $A_M$ for a predetermined period of time T when $T_W > T_{WO}$. The predetermined area $A_M$ is defined by an engine load represented by the engine revolution speed N and fuel injection quantity denoted by $S_i$ described above.

When in step S3 the CPU 51 determines that the engine body 1 is in the predetermined area of the engine operating condition $A_M$ for the predetermined period of time T and determines that the engine operating condition is satisfied in such a way as to execute the map switching determination, the map switching determination is carried out in a step S5 and subsequent steps.

When in either of steps S2 or S3 $T_W \leq T_{WO}$, or the engine operating condition does not enter the predetermined area for the predetermined period of time, the routine goes to a step S4 in which the CPU reads the value $\beta$ with no learning.

On other hand, in the step S5, the CPU 51 corrects and learns the correction quantity $\beta$ of the ignition timing read from the RAM 53 on the basis of the occurrence state of knocking detected by means of the knock sensor 43. Specifically, the correction quantity $\beta$ is progressively advanced until the occurrence of knocking. When the knocking occurs, such a feedback control that a retardation quantity of the ignition timing angle is large as compared with the advanced correction quantity and the correction quantity is again advanced until the occurrence of the knocking is avoided.

In step S6, the CPU 51 determines whether the engine operating condition falls in either one of two determination areas $A_m$, i.e., a low engine revolution speed and high engine revolution speed.

When the engine operating condition falls in the low speed revolution side, the routine goes to step S8 in which the CPU 51 compares the correction quantity $\beta$ learned in the way described above with a determination value B. When the engine operating condition falls in the low engine speed range, the routine goes to step S7 in which the CPU 51 compares the correction quantity $\beta$ with a determination value A.

The routine goes to step S9 when the correction quantity $\beta$ falls below the determination value A or B determining that the ignition timing control using the high-octane gasoline map may be continued. In the S9, a final ignition timing is set by adding the ignition timing correction quantity $\beta$ set in the step S5 to the basic control value. Since the ignition timing correction quantity $\beta$ is corrected toward an advance angle value in the vicinity of the knocking boundary, the engine performance (output) can be increased.

When in either of steps S7 and S8, the CPU 51 determines whether the correction quantity $\beta$ of the ignition timing in step S7 or step S8 (as the advance correction quantity becomes large, the correction quantity $\beta$ is slightly corrected) exceeds the determination value A or B, the CPU 51 determines that the ignition timing using the high-octane gasoline map is too advanced and the current fuel uses the low-octane gasoline. Then, the routine goes to a step S10 in which the map is exchanged to the low-octane gasoline map.

In step S11, the CPU 51 executes such a control that the correction quantity $\beta$ is corrected and learned on the basis of the occurrence of knocking detected by means of the knock sensor 43 in the same way as in the step S5. Thereafter, the routine goes to step S9 in which the final ignition timing is set by adding the correction quantity $\beta$ corrected and learned in the previous steps to the basic control value retrieved through the low-octane gasoline map. In this case, since the correction quantity $\beta$ is advanced to a value in the vicinity of the knocking boundary according to the low-octane gasoline, the engine performance (output) can be increased.

Since the high-octane gasoline fuel map is always used irrespective of the octane number of the fuel used at the same time when the ignition key switch is turned to ON during the start of the engine, the fuel combustion is controlled in accordance with the direct ignition timing angle value although the map switching determination if the high-octane gasoline is used.

In addition, during the use of the low-octane gasoline fuel, the ignition timing is continuously retarded when the map switching determination is carried out and exceeds either of the determination values. Then, the map is switched to the low-octane gasoline fuel. Thereafter, the fuel combustion control using the low-octane gasoline map is continued until the ignition key switch is turned to OFF without switching determination of the maps.

In other words, since the map switching carried out during driving of the engine is in only one direction from the high-octane gasoline map to the low-octane gasoline map, the ignition timing initial value is always derived from the high-octane gasoline map in place of the inhibit of the reverse direction switching from the low-octane gasoline map to the high-octane gasoline map. Therefore, the engine performance designed to accomodate the use of the high-octane gasoline fuel can be sufficiently exhibited immediately after the start of the engine.

In addition, in the case where the map is erroneously switched to the low-octane gasoline map during use of the high-octane gasoline, the high-octane gasoline map is used when the engine drive is once terminated and started. Therefore, such a situation is the case where the high-octane map cannot be used any more. Consequently, engine damage due to the increase in the exhaust gas temperature can be prevented. The increase in the exhaust gas temperature is caused by the long duration of a state in which the engine performance is reduced during the use of the low-octane gasoline.

FIGS. 3 (A) to 4 (B) exemplify the maps for the high-octane gasoline and for the low-octane gasoline.

In FIG. 3 (A), $A_{11}$, $A_{12}$,—, $A_{21}$, $A_{22}$, —denote upper limit values of the ignition timing angle (i.e., the basic control values) determined by the engine revolution speed N and fuel injection quantity $S_i$ in the case of the high-octane gasoline fuel.

In FIG. 3 (B), $B_{11}$, $B_{12}$,—, $B_{21}$, $B_{22}$,—denote the upper limit values in the same way as in FIG. 3 (A) in the case of the low-octane gasoline fuel. It is noted that $A_{ij} > B_{ij}$ (i, j = 1 to n).

In FIGS. 4 (A) and 4 (B), $KLM_1$ and $KLM_2$ denote the correction quantities $\beta$ of the ignition timing angle.

As described hereinabove, since in the system and method for controlling a fuel combustion for an internal combustion engine according to the present invention one of the maps prepared for the high-octane gasoline fuel is always used at the time of the engine start, the engine performace can sufficiently be provided from the initial time of the engine drive when the high-octane gasoline is used for the fuel. In a case where the used map is erroneously switched to one of the maps prepared for the low-octane gasoline, the map prepared for the high-octane gasoline is used at the time when the engine is restarted after the engine stops. Consequently, the engine damage due to the increase in the exhaust gas temperature can be prevented.

It will fully be appreciated by those skilled in the art that the foregoing description has been made in terms of the preferred embodiment and various changes can be made without departing from the scope of the present invention which is to be defined by the appended claims.

What is claimed is:

1. A system for controlling fuel combustion for an internal combustion engine, comprising:
    (a) first means for detecting an engine operating condition;
    (b) second means for setting and storing basic control values into a plurality of maps, each of said basic control values defined for controlling a fuel combustion state according to said engine operating condition and each of said maps being prepared therein for each fuel having a different octane number;
    (c) third means for setting a control value defined for controlling said combustion state on the basis of a basic control value retrieved from one of said maps according to said engine operating condition;
    (d) fourth means for selecting and using one of said maps which corresponds to a fuel having an octane number exceeding a predetermined value whenever said engine is started irrespective of an engine fuel actually used; and
    (e) fifth means for deriving a control value defined for controlling said fuel combustion state on the basis of a selected basic control value and operating a parameter associated with a combustion state on the basis of said selected control value.

2. A system as set forth in claim 1, which further comprises:
    (f) sixth means for detecting an occurrence of engine knocking;
    (g) seventh means for determining whether said engine falls in a predetermined area of said engine operating condition during use of a map used by said fifth means, reducing said basic control value derived according to said engine operating condition by a retardation amount when an occurrence of engine knocking is detected, and switching from a map used by said fifth means to another map which corresponds to fuel having an octane number below said predetermined value when said retardation amount exceeds a switching reference value.

3. A system as set forth in claim 2, wherein said fifth means derives said control value on the basis of said selected basic control value by said fourth means from said map or that retrieved from said other map switched by said seventh means.

4. A system as set forth in claim 3, wherein said first means comprises eighth means for detecting an engine coolant temperature, ninth means for detecting an engine speed, and tenth means for detecting a fuel injection quantity.

5. A system as set forth in claim 4, wherein said seventh means includes eleventh means for determining whether said engine coolant temperature detected by said eighth means exceeds a predetermined temperature and whether said engine falls in a predetermined area for a predetermined period of time so as to determine whether said engine falls in said predetermined area and twelfth means for correcting and learning a retardation amount according to an occurrence of engine knocking when said eleventh means determines that said engine falls in said predetermined area.

6. A system as set forth in claim 5, wherein said seventh means further includes thirteenth means for determining whether said engine speed detected by said ninth means falls in either of a high or a low speed range and wherein said seventh means determines whether said retardation amount exceeds a switching reference value which is different according to a result of a determination of whether said engine speed falls in said high or said low speed range.

7. A system as set forth in claim 6, wherein said seventh means further includes fourteenth means for correcting and learning said retardation amount according to an occurrence of engine knocking when said map is switched to said other map which corresponds to fuel having an octane number below said predetermined value.

8. A system as set forth in claim 7, wherein said predetermined value of octane number is about 91 and fuel having an octane number exceeding about 91 has an octane number indicating about 98.

9. A system as set forth in claim 7, wherein said basic control value indicates a basic ignition timing angle value derived according to said engine speed and fuel injection quantity.

10. A system for controlling fuel combustion for an internal combustion engine, comprising:
   (a) first means for detecting an engine operating condition;
   (b) second means for detecting an occurrence of engine knocking;
   (c) third means for setting and storing into one of a plurality of maps basic control values defined for controlling combustion states according to said engine operating condition, each of said maps being prepared for one kind of fuel having a different octane number;
   (d) fourth means for selecting a first one of said maps which corresponds to basic control values for fuel having an octane number exceeding a predetermined value when said engine is started irrespective of a fuel in actual use;
   (e) fifth means for determining whether said engine falls in a predetermined area of said engine operating condition during use of a first map, retarding an ignition timing value by a retardation amount upon detection of an occurrence of knocking when said engine falls in said predetermined area and for switching from said first map to a second one of said maps prepared for fuel having an octane number below said predetermined value when said retardation amount exceeds a switching reference value;
   (f) sixth means for setting control values defined for controlling combustion states and retrieved from one of said maps according to said engine operating condition which is selected by said fourth means for switched by said fifth means; and
   (g) seventh means for operating a parameter concerning each combustion state of said engine on the basis of outputted control values derived from said sixth means.

11. A method for controlling fuel combustion for an internal combustion engine, comprising the steps of:
   (a) detecting an engine operating condition;
   (b) setting and storing basic control values into a plurality of maps, each of said basic control values defined for controlling a fuel combustion state according to said engine operating condition and each of said maps being prepared therein for each fuel having a different octane number;
   (c) setting a control value defined for controlling said combustion state on the basis of a basic control value retrieved from one of said maps according to said engine operating condition;
   (d) selecting and using one of said maps which corresponds to fuel having an octane number exceeding a predetermined value whenever said engine is started irrespective of an engine fuel in actual use; and
   (e) deriving a control value defined for controlling said combustion state on the basis of said basic control value control value and operating a parameter associated with said combustion state on the basis of said control value.

* * * * *